Oct. 27, 1936. R. P. LANSING 2,059,122
PROPELLER
Filed Sept. 15, 1932
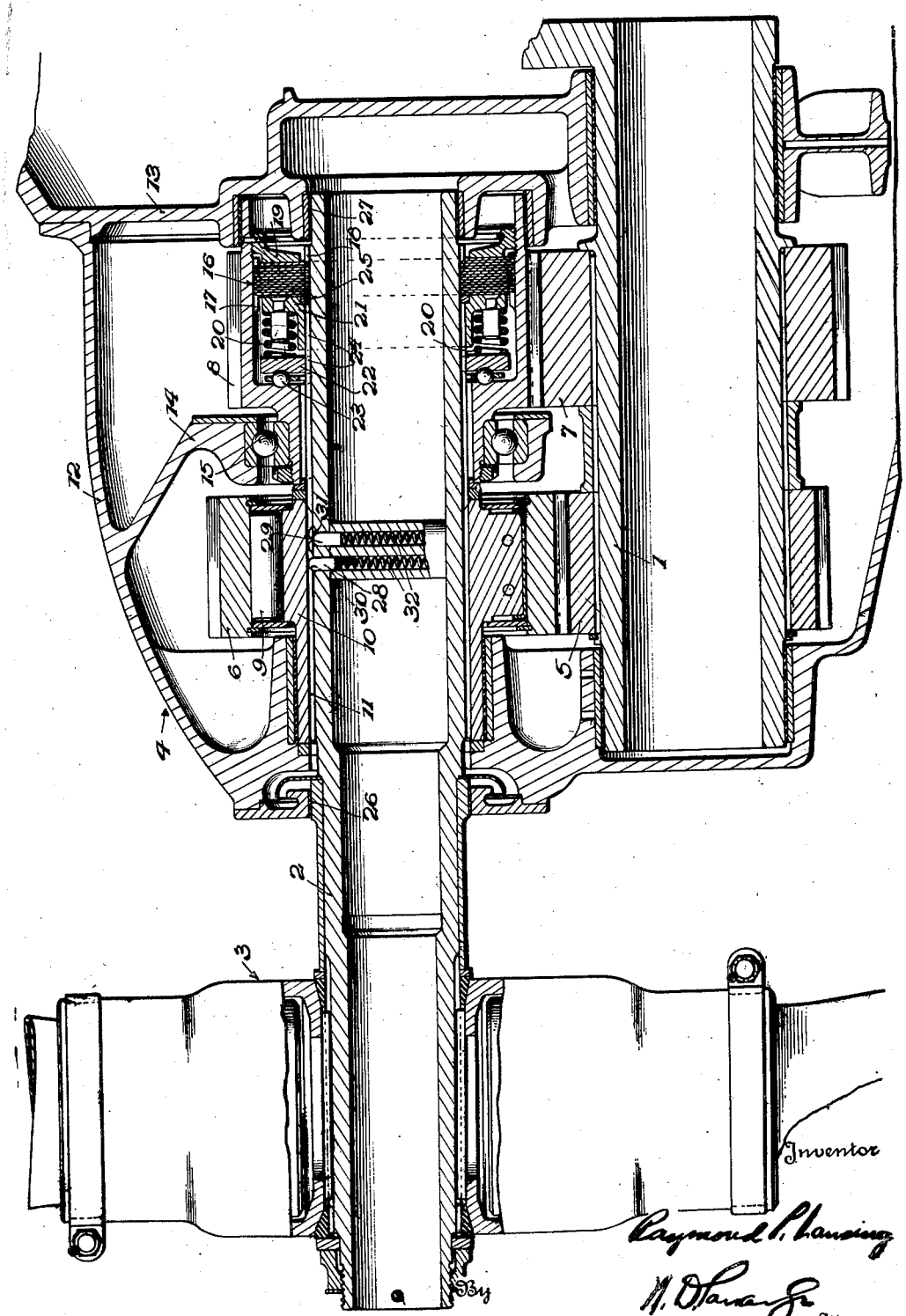

Patented Oct. 27, 1936

2,059,122

UNITED STATES PATENT OFFICE 2,059,122

PROPELLER

Raymond P. Lansing, Montclair, N. J., assignor, by mesne assignments, to Eclipse Aviation Corporation, East Orange, N. J., a corporation of New Jersey Application September 15, 1932, Serial No. 633,351

10 Claims. (Cl. 244—25)

This invention relates to propellers and more particularly to propellers of the type adapted to be associated with a driving mechanism through connections of different speed ratios.

Propellers of the above character, embodying a plurality of driving connections of different speed ratio. Such an arrangement has heretoincluded manually operable means for selectively connecting the propeller and driving member through a desired mechanism of predetermined speed ratio. Such an arangement has heretofore necessitated the incorporation of complicated manual control mechanism which not only adds to the weight of the propeller construction but also requires the attention of the pilot, which might more advantageously be employed elsewhere, especially in instances of aircraft installations.

It is accordingly one of the objects of the present invention to provide a variable speed propeller which is so constituted as to avoid the disadvantages inherent in the constructions heretofore utilized.

Another object is to provide a variable speed propeller wherein the change from one driving connection to another shall be effected in an automatic manner, thus relieving the pilot of any necessity of manually varying the propeller driving connections.

Still another object is to provide, in a variable speed propeller, a novel arrangement of driving connections so constructed that, in instances of aircraft installations and during take-off, for example, the propeller drive will automatically assume a position such that maximum efficiency may be obtained from the propeller driving engine.

A further object is to provide an automatic variable speed propeller so arranged that the thrust of the propeller will effect a change in the ratio of the drive between the propeller and engine.

A still further object is to provide a propeller of the above character so constructed that during take-off, the thrust of the propeller will automatically effect a driving connection of a predetermined ratio between the latter and the engine while during cruising, the decrease in thrust of the propeller will permit a driving connection of a different ratio to be established.

A still further object is to provide a novel variable speed propeller construction which is so constituted as to be unusually compact, light in weight and positive in operation, and which will be materially more efficient than variable speed propellers heretofore employed.

Other novel features of the invention will be more fully understood from the following detailed description when taken in connection with the accompanying drawing, illustrative of one form of the invention. It is to be expressly understood, however, that the drawing is for purposes of illustration only and is not to be taken as a definition of the limits of the invention, reference being had for such purpose to the appended claims.

Referring to the drawing, the single figure of which illustrates in section, a variable speed propeller constructed in accordance with the present invention, an engine or driving shaft 1 is adapted to be connected to a driven shaft 2 carrying a propeller 3 by means of a novel variable speed mechanism indicated generally at 4.

As shown, the driving and driven shafts are connected together through two sets of normally intermeshed gears, the low speed set comprising gears 5 and 6, while the high speed set includes gears 7 and 8. Each of the gears 5 and 7 is keyed or otherwise suitably secured to the driving shaft 1. Gear 6 is connected to the driven shaft 2 through an overrunning clutch 9 of any suitable construction, there being interposed between said clutch and said shaft, a sleeve 10, splined to said shaft at 11, in order to effect a drivable connection between said last two-named parts while permitting relative longitudinal movement therebetween.

In order to form a suitable housing and support for the gearing, the latter is surrounded by a casing 12, secured in any suitable manner to a portion of the engine casing 13, the same having an intermediate portion 14 forming a seat for an annular row of bearings 15 for rotatably mounting the gear 8. As shown, this last-named gear is normally drivably connected with the driven or propeller shaft 2 through a friction disk clutch 16, alternate disks thereof being respectively splined to the gear 8 at 17 and to the shaft 2 at 18. An annular abutment 19, threadedly received by the gear 8, forms a stop for arresting inward movement of the clutch disks, while a plurality of springs 20 interposed between a collar 21 abutting the clutch and a collar 22 rotatably mounted with respect to the gear 8 as by means of a bearing 23, normally serves to maintain the clutch disks in torque-transmitting frictional engagement. The tension of the springs 20 and hence the torque-transmitting capacity of the clutch 16 may be readily adjusted by means of the abutment 19. The collars 21 and 22, as shown, are splined to the shaft 2 at 24. A suitable abutment such as a ring 25 is rigidly secured to the shaft 2 in any suitable manner and extends within a small recess in the collar 21 for a purpose which will appear more fully hereinafter.

The construction heretofore described is such that, upon rotation of the propeller, the thrust or draw bar pull thereof will effect a longitudinal movement of the shaft 2 toward the left as viewed in the drawing. In order to provide sufficient bearing surface for said shaft, the casing 12 at its forward end carries a sleeve bearing 26, while a similar sleeve bearing 27 surrounds the shaft 2 at its inner end, the last-named bearing being carried by a portion of the engine crank case 13.

In order to positively maintain the shaft 2 in either the position shown or in the position to which the same is moved in accordance with a predetermined degree of thrust of the propeller, a pair of plungers or detents 28 and 29 are slidably mounted in the said shaft, and are so arranged as to engage, under predetermined conditions, depressions 30 and 31 respectively, formed in the member 10. Each plunger is resiliently urged outwardly by means of springs 32 and the construction is such that, in operation, plunger 28 will occupy depression 30 or plunger 29 will be received in depression 31. Thus any hunting of the shaft 2 will be avoided, the latter occupying either extreme position determined by the spacing between depressions 30 and 31.

With the engine shaft and propeller at rest, the parts will assume the positions indicated on the drawing by reason of the expansion of springs 20, the latter maintaining the clutch disks of clutch 16 firmly engaged. During initial rotation of the shaft 1, the propeller will be driven through intermeshed gears 7 and 8, clutch 16 and shaft 2, it being understood that the clutch 9 associated with the low speed gearing 5, 6 will overrun at this time. During take-off, however, with the engine operating at substantially full throttle, the thrust of the propeller will be a maximum, and will effect a longitudinal movement of the propeller shaft 2 toward the left, as viewed in the drawing, assuming a tractor type propeller is employed. Ring 25, secured to shaft 2, will then become effective to move collar 21 toward the left, thereby compressing springs 20 and gradually reducing the torque-transmitting capacity of clutch 16 to such a degree that plunger 29 will be urged into depression 31. As the friction between the disks of the clutch 16 is gradually reduced, the torque of the engine shaft will be transmitted through gears 5, 6 and to the sleeve 10 secured to shaft 2, it being understood that the overrunning clutch 9 will become engaged as soon as the torque-transmitting capacity of the disk clutch 16 is reduced sufficiently to discontinue the propeller drive through the gears 7 and 8, the said overrunning clutch under these conditions drivably connecting the gear 6 with the sleeve 10. Thus during take-off, the propeller drive is through the low speed gearing 5, 6, enabling the engine speed to be increased to such an extent that the engine will deliver maximum power, and at the same time maintaining the propeller speed at a value consistent with safety and high efficiency, which conditions are highly desirable during take-off. Moreover, as soon as the take-off has been completed and the thrust of the propeller is reduced in accordance with the increase in air speed, the expansive effect of the springs 20, acting upon the shaft 2 in opposition to the thrust, will overcome the latter and effect a movement of the shaft 2 and propeller toward the right, as viewed in the drawing, and establish a propeller driving connection with the engine shaft through the high speed gearing 7, 8 and friction clutch 16. Under such latter conditions, it will be readily appreciated that since the propeller is now being driven through the high speed gearing 7, 8, the engine speed may be materially reduced, thus effecting a marked economy in the operation of the engine, while still maintaining the propeller speed substantially constant.

The term thrust used in the appended claims is understood to be synonymous with the term draw bar pull and represents the force exerted by the propeller in moving or tending to move an airplane through the air.

There is thus provided by the present invention an improved variable speed propeller construction which is automatically operable in accordance with an operating condition of the propeller to vary the driving connections of the propeller in such a manner that the engine and propeller efficiencies may be materially increased. By employing the propeller thrust to vary the driving connections, the low speed drive is assured during take-off, thus enabling the engine speed to be increased to such a value as to develop maximum power without increasing the propeller speed.

While there has been illustrated and described only one embodiment of the invention, it is to be understood that the same is not limited thereto but may be embodied in other forms. Reference will, therefore, be had to the appended claims for a definition of the limits of the invention.

What is claimed is:

1. The combination with a propeller, of an engine driven shaft, means including a plurality of driving connections of different speed ratios between said propeller and shaft, and means responsive to the thrust of said propeller for automatically changing the propeller drive from one to another of said connections.

2. The combination with a propeller having a plurality of blades, of a driving shaft, a plurality of driving connections of different speed ratios between said shaft and said blades, and means operable by relative movement between said propeller and shaft in response to the thrust of the latter for changing the propeller drive from one to another of said connections.

3. The combination with a propeller having a plurality of blades, of a driving shaft, a plurality of driving connections of different speed ratios between said shaft and said blades, and a clutch controlling one of said connections, said clutch being disengageable during operation of the propeller in response to a predetermined degree of thrust of the latter to change the propeller drive from one to another of said connections.

4. The combination with a propeller having a plurality of blades, of a driving shaft, a plurality of driving connections of different speed ratios between said shaft and said blades, and a clutch controlling one of said connections, said clutch being automatically operable in response to the thrust of said propeller for changing the propeller drive from one to another of said connections.

5. The combination with a propeller having a plurality of blades, of a driving shaft, a plurality of constantly engaged gear trains of different speed ratios drivably connecting said shaft and blades, and means automatically operable in response to the thrust of the propeller for changing the propeller drive from one to another of said gear trains.

6. The combination with a propeller having a plurality of blades, of a driving shaft, a plurality of constantly engaged gear trains of different speed ratios drivably connecting said shaft and blades, and a clutch controlling one of said gear trains, said clutch being disengageable during operation of the propeller in response to a predetermined degree of thrust of the latter to change the propeller drive from one to another of said gear trains.

7. The combination with a propeller having a plurality of blades, of a driving shaft, a plurality of constantly engaged gear trains of different speed ratios drivably connecting said shaft and blades, and a clutch controlling one of said gear trains, said clutch being automatically operable in response to the thrust of said propeller to change the propeller drive from one to another of said gear trains.

8. In a propeller and drive therefor, an engine driven shaft, a propeller shaft, a plurality of gear trains of different speed ratios connecting said shafts, one of said gear trains including an overrunning clutch, and means automatically operable in response to the thrust of said propeller for rendering the other of said gear trains either operative or inoperative to transmit torque between said shafts.

9. In a propeller and drive therefor, a driving shaft and a driven shaft, means including a plurality of intermeshed gear trains for drivably connecting said shafts, one of said gear trains including an overrunning clutch, a normally engaged friction clutch associated with another of said gear trains, and means responsive to the thrust of said propeller for moving the driven shaft relative to the driving shaft to render said friction clutch inoperative.

10. In a propeller and drive therefor, a driving shaft and a driven shaft, a propeller hub and blades secured to said driven shaft, a plurality of intermeshed gear trains interposed between said shafts, one of said gear trains including an overrunning clutch, and means responsive to the thrust of said propeller for rendering said clutch operative and inoperative, the drive between said shafts being through said last-named gear train when said clutch is rendered operative and being through another of said gear trains when said clutch is rendered inoperative.

RAYMOND P. LANSING.